Jan. 30, 1962     C. C. MALLORY     3,019,060
GOVERNOR OPERATED BRAKING SYSTEM
Filed Aug. 14, 1958     2 Sheets-Sheet 1

INVENTOR.
CLARENCE C. MALLORY
BY
ATTORNEY

INVENTOR.
CLARENCE C. MALLORY
ATTORNEY

United States Patent Office 3,019,060
Patented Jan. 30, 1962

3,019,060
GOVERNOR OPERATED BRAKING SYSTEM
Clarence C. Mallory, 4900 W. 6th Ave., Denver, Colo.
Filed Aug. 14, 1958, Ser. No. 755,091
4 Claims. (Cl. 303—21)

The present invention relates to a governor system for automotive vehicles and, more particularly, to a governor actuated braking system for such vehicles.

Previously, many different types of governors have been designed and built by others, and in some instances it has been an object of prior inventions to limit the top speed of vehicles through application of braking forces.

The object of the present invention is likewise to provide a system which will limit the top speed by the application of braking force, but in doing so it is a further object of this invention to provide a system which does not in any way limit the safety and control functions of the braking system.

A main object of the invention is to provide means for automatic application of braking force at any time that the vehicle on which the equipment is installed exceeds the desired rate of speed. In order to accomplish this desirable result, it is a further object of this invention to provide governor apparatus sensitive to the speed of the vehicle for the automatic operation of a valve mechanism in the braking system.

Another object of this invention is to provide means operative in such manner that direct application of the brakes by the driver or operator will override the braking force being applied automatically by the governor system when the vehicle is going too fast.

Figure 1:
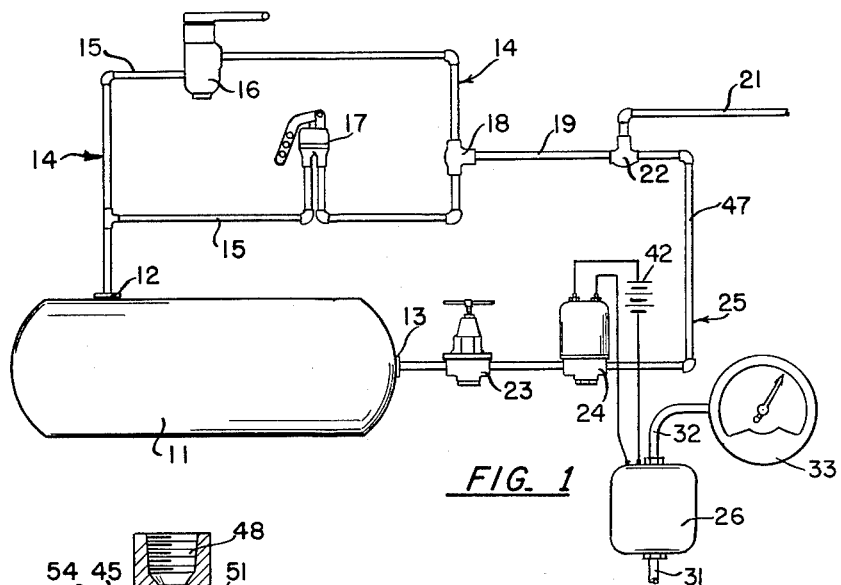
Figure 3:
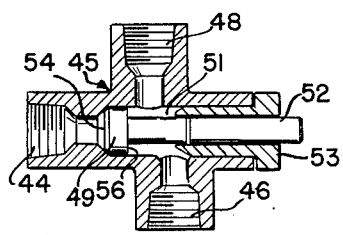
Figure 2:
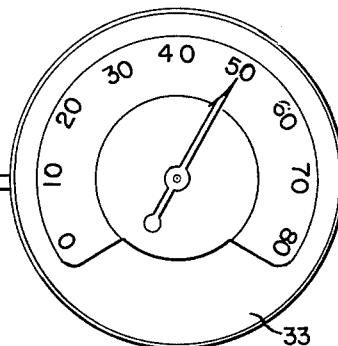
Figure 2:
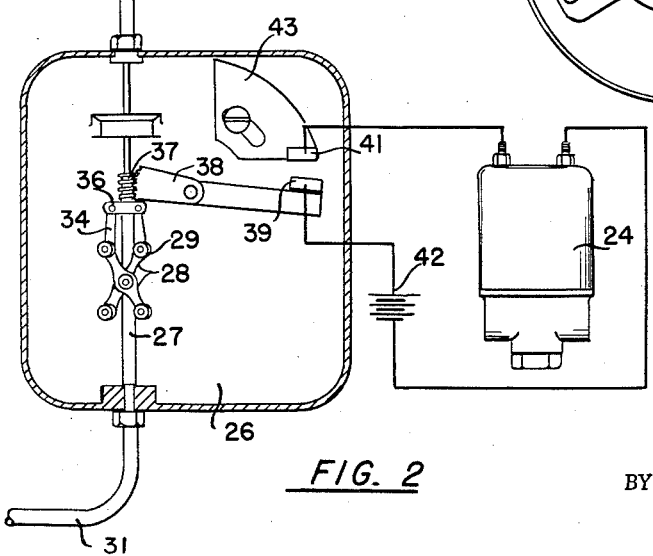
Figure 4:
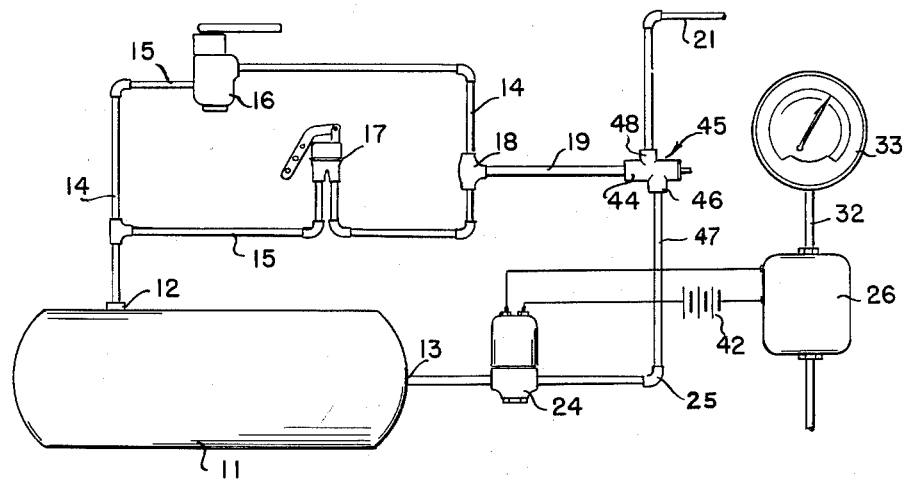

Further objects and advantages of the present invention will be apparent from the appended description and drawings, in which FIG. 1 is an elevation showing the elements of this invention as applied to a typical pressurized air braking system, FIG. 2 is an elevation in partial section inclusive of a schematic wiring diagram showing details of a governor control apparatus interconnected with the vehicle speedometer and, further, with the automatic control valve utilized in the braking system, FIG. 3 is an elevation in partial section showing the details of construction for a balanced pressures type of check valve which may be utilized in a pressurized air braking system in place of other elements of this invention, previously described, and FIG. 4 is a schematic elevation showing alternate elements of the invention as applied to a typical air braking system.

Briefly stated, the present invention provides a governor controlled brake application system which is designed to apply the brakes of a vehicle at any time that the vehicle exceeds the desired top rate of speed. A fly ball or other type governor is used to energize a solenoid control valve positioned in an auxiliary brake system so that operation of the solenoid will control the flow of air in the braking system to apply the vehicle brakes. In order to assure overriding control for the regular braking system, means is provided for maintaining the auxiliary system at a reduced pressure or alternately for providing a selective pressure valve which will be more readily actuated by the primary braking system than by the auxiliary system.

Referring now to the drawings, the use of the present invention in a compressed air braking system is shown in FIG. 1. Here an air reservoir 11 is shown into which a supply of air under pressure is introduced, as by a compressor or other means (not shown). Two outlets 12 and 13 are provided for the reservoir, the first of which, numbered 12, is connected to the primary braking system 14. The air lines 15 of the primary braking system lead in parallel arrangement to a hand operated brake valve 16 and a foot or pedal operated valve 17. These separate and parallel control units of the primary system 14 are connected and recombined at double check valve 18 in such manner that either or both of the valves 16 or 17 may be energized at any time to introduce air under pressure into the primary system line 19. Since double check valve 18 is used, a failure in either of the parallel control units or in the connecting lines will not cause failure of the system. In case of failure of one unit of the primary system, the other unit could be energized through use of its separate control valve 16 or 17.

Under ordinary circumstances the air under pressure in the primary system which has progressed to the line 19 will move directly therefrom into the main brake line 21. This passage, however, is through a second check valve 22 placed in the system so that the governor operated and automatically energized valving apparatus of the auxiliary system may likewise be directed into the main brake line 21. The auxiliary system 25, as shown in FIG. 1, includes a pressure regulator 23 which is provided to maintain the air in the auxiliary system at a pressure lower than the pressure within the primary system 14. Further, a solenoid operated valve 24 is provided in this auxiliary system so that air from the reservoir passing through the regulator may be introduced into the main braking line 21 only when the solenoid valve is opened. With the arrangement shown, solenoid valve 24 will be opened when the solenoid circuit is energized, and air at reduced pressure will then pass through the auxiliary system to the check valve 22.

It is intended that the actuation of the solenoid valve 24, and therefore actuation of the auxiliary braking system, will be controlled by a governor type apparatus sensitive to the speed of the vehicle. Accordingly, excessive speed will cause braking force to be applied to slow the vehicle. Since a pressure regulator 23 is used in the auxiliary system 25, the pressure of air introduced into the main brake line 21 by the auxiliary system may be closely regulated. The braking effort applied, therefore, by the auxiliary system may be either minimal so that it will merely slow or retard the vehicle, or it may be sufficient to set the brakes and stop the vehicle. Either result might be desirable under certain conditions (as when a vehicle is out of control), but it is contemplated that mere slowing of the vehicle to an acceptable rate of speed will be preferred.

With the system as described in FIG. 1, it should be noted that air passing through the primary system 14 will exert a greater force on the check valve unit 22 than that passing through the auxiliary system. Accordingly, at any time, and especially in cases of emergency, the vehicle brakes may be applied through actuation of either the hand operated brake valve 16 or the foot operated pedal valve 17, as desired. Accordingly, even though the vehicle may be in an overspeed condition which causes actuation of the auxiliary braking system 25, the primary braking system 14 would still be effective to more readily slow and control the speed of the vehicle. Accordingly, the pressure regulator is of importance in the system to provide an overriding feature as well as to control the force of the braking effort applied by actuation of the auxiliary braking system.

A type of governor apparatus which is suitable for the functions of this device is shown in FIGS. 1, 2 and 4 wherein the governor apparatus 26 is shown to include a rotating shaft 27, a scissors-type mounting 28 and fly balls 29. With this arrangement, connection of the governor apparatus 26 to the usual speedometer power take-off 31 will cause shaft 27 to rotate at speeds corresponding to the speed of the vehicle. The rotational speed attained is further transmitted by cable 32 which is connected to the other end of the shaft 27 to a conventional type speedometer 33 so that the driver or operator will be apprised at all times of the speed of the vehicle.

Whenever the rotational speed of the shaft 27 increases, the tendency of the fly balls 29 to move outwardly will be increased. When this speed has increased to an amount sufficient to overcome the forces of gravity and of a control spring if provided, the scissors arrangement will cause the links 34 and the slide unit 36 to be moved downwardly on the shaft 27. As the slide unit 36 moves downwardly, the worm gear 37 will likewise be moved downwardly and control arm 38 which is in meshing engagement with the worm gear 37 will be moved downwardly. This movement will cause the electrical contact 39 to move upwardly until contact is made with the other of the contact points 41 to close a circuit through such contact points and through the vehicle battery 42 and the windings of the solenoid 24. The closing of this circuit necessarily will cause actuation of the solenoid to open the valve 24 and allow passage of air through the auxiliary system 25.

In order to more closely control the speed at which the circuit is to be closed, adjusting means 43 is provided within the governor structure 26 so that the positioning of contact points 41 may be adjusted. With an arrangement of this type, the speed at which the brakes will be actuated may be closely controlled, and likewise a range of speeds for brake application may be obtained. While the fly ball type governor is shown, it is obvious that other types of governor apparatus could be utilized, and further while the governor apparatus illustrated is used to close an electrical circuit, it would also be possible to make an operative system in which the circuit is opened or even to provide governed mechanical means for actuating the auxiliary control valve 24.

Since the major purpose of the provisions of the regulator 23 is to assure overriding control for the primary braking system and since systems could be used in which it was not necessary to control the force of brake application due to the actuation of the governor operated system, it is possible that the regulator may be eliminated from the system through provision of a pressure selective type of check valve.

A type of valve that would adequately satisfy this purpose is shown in FIG. 3. Here and in FIG. 4 the desired type of valve 45 is provided with a plurality of connections, the first of which, here designated as 44, could preferably be connected to the primary braking system 14 and to the line 19. A second port designated 46 could be connected to the line 47 of the auxiliary system 25, and the third port 48 would be connected to the main brake line 21. Within the body of the pressure sensitive valve, a piston unit 49 is provided. This piston slides reciprocally within the chamber 51 of valve 45 and the stem 52 of the piston 49 would extend out through closure plug 53. With this arrangement, the air pressure from the primary system 14 would act against the flat face 54 of the valve 49, whereas air introduced under pressure in the auxiliary system 25 would act only against the exposed rim 56 on the opposite face of the piston 49. Since the area of exposure for the auxiliary side of the unit would be less than the area exposed to the primary side, it would not be necessary to maintain the air in the auxiliary system at reduced pressure in order to assure overriding actuation by the primary system. At any time that the primary system was actuated, the slide piston 49 would be moved reciprocally to open a direct passage between the primary system and the main brake line 21. This would be true even though the vehicle were in an overspeed condition and air under pressure was being introduced through the auxiliary system 25 and through control valve 24.

While separate embodiments of the invention have been shown and described, it will be apparent to those skilled in the art that this invention is adaptable to various modifications and changes. All such modifications and changes as come within the scope of the hereunto appended claims are deemed to be a part of this invention.

What is claimed is:

1. Apparatus for governing the speed of motor vehicles utilizing air pressure differential type of brake actuating apparatus which comprises a primary air system, an auxiliary air system, check valve means interconnecting both of said systems to the brake actuating apparatus of said vehicle, said check valve operating to selectively permit flow of air to and from the brake actuating apparatus and the one of said systems which has the highest pressure differential at that time, pressure responsive means in said auxiliary air system for assuring the preferential interconnection of said primary air system and brake actuating apparatus, and governor operated valving means for releasing the pressure influences of said auxiliary system selectively past said check valve means when the primary system is not activated and into the said brake actuating apparatus when the vehicle is exceeding a predetermined speed whereby the differential air pressure in said auxiliary system will actuate the brakes of said vehicle to slow the vehicle.

2. Apparatus for governing the speed of motor vehicles utilizing air pressure differential type of brake actuating apparatus which comprises a primary air system, an auxiliary air system, check valve means interconnecting both of said systems to the brake actuating apparatus of said vehicle, said check valve operating to selectively permit flow of air to and from the brake actuating apparatus and the one of said systems which has the highest pressure differential at that time, an air pressure regulator in one of said systems for assuring the preferential interconnection of said primary air system and brake actuating apparatus, and governor operated valving means for releasing the pressure influences of said auxiliary system selectively past said check valve means when the primary system is not activated and into the said brake actuating apparatus when the vehicle is exceeding a predetermined speed whereby the differential air pressure in said auxiliary system will actuate the brakes of said vehicle to slow the vehicle.

3. Apparatus for governing the speed of motor vehicles utilizing air pressure differential type of brake actuating apparatus which comprises a primary air system, an auxiliary air system, check valve means interconnecting both of said systems to the brake actuating apparatus of said vehicle, said check valve operating to selectively permit flow of air to and from the brake actuating apparatus and the one of said systems which has the highest pressure differential at that time, an air pressure regulator for maintaining a pressure differential between said auxiliary system and the brake actuating apparatus lower than the pressure differential between said primary air system and brake actuating apparatus for assuring the preferential interconnection of said primary air system and said brake actuating apparatus, and governor operated valving means responsive to the speed of the vehicle for releasing the pressure influences of said auxiliary system selectively past said check valve means when the primary system is not activated and into the said brake actuating apparatus when the vehicle is exceeding a predetermined speed whereby the differential air pressure in said auxiliary system will actuate the brakes of said vehicle to slow the vehicle.

4. Apparatus for governing the speed of motor vehicles utilizing air pressure differential type of brake actuating apparatus which comprises a primary air system, an auxiliary air system, check valve means interconnecting both of said systems to the brake actuating apparatus of said vehicle, said check valve operating to selectively permit flow of air to and from the brake actuating apparatus and the one of said systems which has the highest pressure differential at that time, an air pressure regulator in said auxiliary system for assuring the preferential interconnection of said primary air system and brake actuating apparatus, and governor operated valving means for releasing the pressure influences of said auxiliary system selectively past said check valve means when the primary system is not activated and into the said brake actuating apparatus when the vehicle is exceeding a predetermined speed whereby the differential air pressure in said auxiliary system will actuate the brakes of said vehicle to slow the vehicle, said air pressure regulator being inclusive of means for changing the air pressure differential in said auxiliary system to regulate the brake actuating force applied.

References Cited in the file of this patent

UNITED STATES PATENTS

| | | |
|---|---|---|
| 950,477 | Courtois | Mar. 1, 1910 |
| 1,512,167 | Gore | Oct. 21, 1924 |
| 1,636,064 | Moxley | July 19, 1927 |
| 1,664,787 | Oakley | Apr. 3, 1928 |
| 2,193,224 | Cowles | Mar. 12, 1940 |
| 2,292,105 | Davis | Aug. 4, 1942 |
| 2,451,139 | Williams et al. | Oct. 12, 1948 |
| 2,651,387 | Genter | Sept. 8, 1953 |
| 2,701,035 | Leichsenring | Feb. 1, 1955 |
| 2,714,943 | Whaley | Aug. 9, 1955 |